United States Patent
Fukuzawa et al.

(10) Patent No.: US 10,862,314 B2
(45) Date of Patent: Dec. 8, 2020

(54) WIRELESS POWER TRANSMITTING DEVICE, WIRELESS POWER RECEIVING DEVICE, AND WIRELESS POWER TRANSMISSION SYSTEM

(71) Applicant: TDK Corporation, Tokyo (JP)

(72) Inventors: Narutoshi Fukuzawa, Tokyo (JP); Akira Gotani, Tokyo (JP); Kazuki Kondo, Tokyo (JP); Kazunori Oshima, Tokyo (JP)

(73) Assignee: TDK CORPORATION, Tokyo (JP)

( * ) Notice: Subject to any disclaimer, the term of this patent is extended or adjusted under 35 U.S.C. 154(b) by 11 days.

(21) Appl. No.: 16/469,523

(22) PCT Filed: Dec. 20, 2017

(86) PCT No.: PCT/JP2017/045743
§ 371 (c)(1),
(2) Date: Jun. 13, 2019

(87) PCT Pub. No.: WO2018/123767
PCT Pub. Date: Jul. 5, 2018

(65) Prior Publication Data
US 2019/0386492 A1    Dec. 19, 2019

(30) Foreign Application Priority Data

Dec. 27, 2016    (JP) ................. 2016-253817

(51) Int. Cl.
*H02J 5/00*    (2016.01)
*H02J 50/80*    (2016.01)
(Continued)

(52) U.S. Cl.
CPC .............. *H02J 5/005* (2013.01); *H02J 7/025* (2013.01); *H02J 50/12* (2016.02); *H02J 50/60* (2016.02); *H02J 50/80* (2016.02)

(58) Field of Classification Search
CPC .. H02J 5/005; H02J 50/80; H02J 50/12; H02J 50/60; H02J 7/025
(Continued)

(56) References Cited

U.S. PATENT DOCUMENTS

2013/0162054 A1    6/2013  Komiyama
2013/0241300 A1*   9/2013  Miyamoto ............... G01V 3/10
                                                     307/104
(Continued)

FOREIGN PATENT DOCUMENTS

JP    2013-132133 A    7/2013
JP    2015-211536 A    11/2015

OTHER PUBLICATIONS

International Search Report issued in corresponding International Patent Application No. PCT/JP2017/045743, dated Feb. 27, 2018, with English Translation.

*Primary Examiner* — Tomi Skibinski
(74) *Attorney, Agent, or Firm* — McDermott Will & Emery LLP

(57) ABSTRACT

An object of the present invention is to improve detection accuracy of a metallic foreign object between a feeding coil and a receiving coil during wireless power feeding. A wireless power transmitting device is a device that performs power transmission by wireless using an alternating magnetic field vibrating at a predetermined power transmission frequency and includes a feeding coil, an antenna coil, a capacitor that constitutes a resonance circuit RC together with the antenna coil, a noise detection part that detects noise vibrating at a frequency higher than the power transmission frequency, and a foreign object detection part 140 that detects the presence/absence of a metallic foreign object based on a change in voltage or current generated in the resonance circuit RC and a noise detection result from the noise detection part.

16 Claims, 14 Drawing Sheets

(51) Int. Cl.
 *H02J 50/12* (2016.01)
 *H02J 50/60* (2016.01)
 *H02J 7/02* (2016.01)
(58) Field of Classification Search
 USPC .......................................... 307/104
 See application file for complete search history.

(56) References Cited

U.S. PATENT DOCUMENTS

| | | | |
|---|---|---|---|
| 2014/0091787 A1* | 4/2014 | Hyodo | H02J 50/12 324/236 |
| 2015/0171633 A1* | 6/2015 | Nakano | H04B 5/005 307/104 |
| 2017/0033609 A1 | 2/2017 | Nakamura et al. | |
| 2020/0091776 A1* | 3/2020 | Kondo | H02J 50/60 |

* cited by examiner

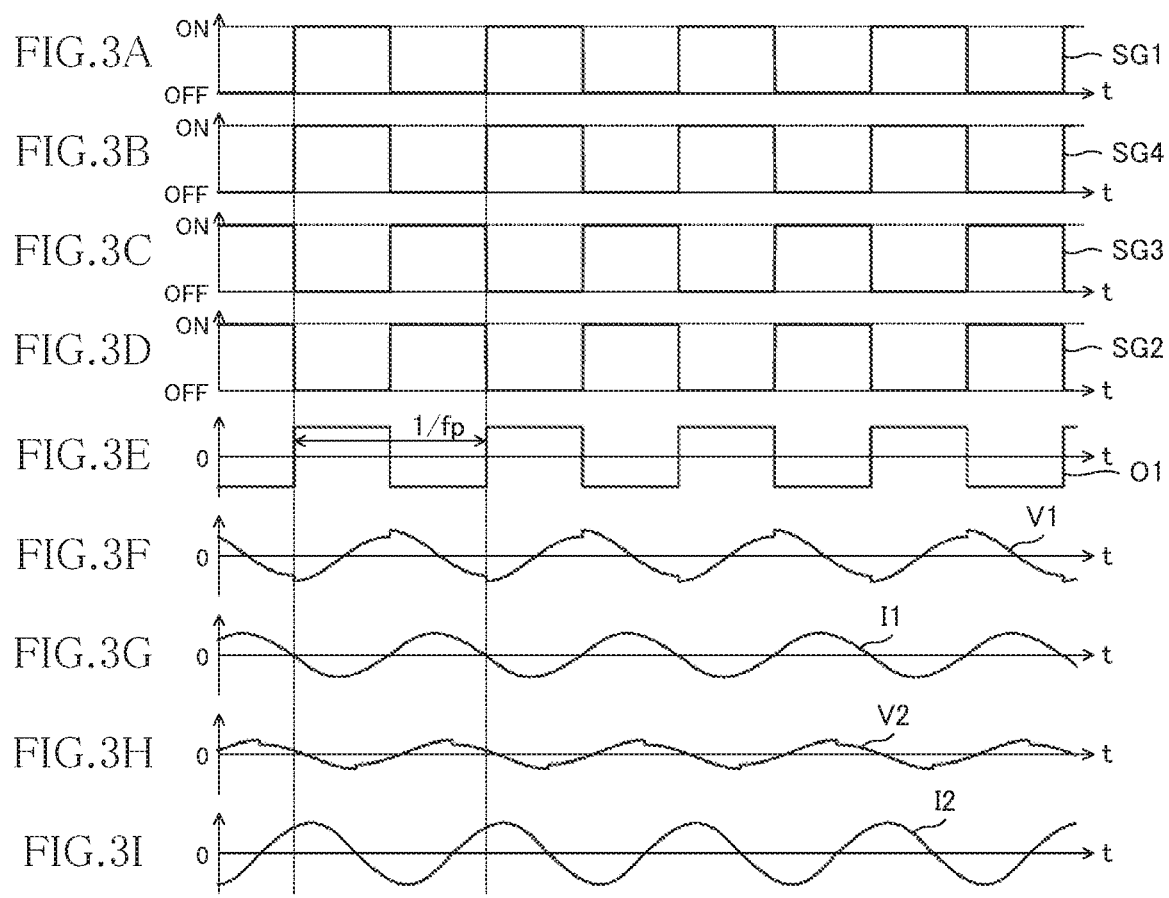

WIRELESS POWER TRANSMITTING DEVICE, WIRELESS POWER RECEIVING DEVICE, AND WIRELESS POWER TRANSMISSION SYSTEM

CROSS REFERENCE

This application is the U.S. National Phase under 35 US.C. § 371 of International Application No. PCT/JP2017/045743, filed on Dec. 20, 2017, which claims the benefit of Japanese Application No. 2016-253817, filed on Dec. 27, 2016, the entire contents of each are hereby incorporated by reference.

TECHNICAL FIELD

The present invention relates to a wireless power transmitting device, a wireless power receiving device, and a wireless power transmission system.

BACKGROUND ART

In recent years, wireless power feeding adapted to feed power by wireless has been eagerly studied. There are various systems for realizing the wireless power feeding, and a system using a magnetic field is known as one of them. The system using a magnetic field includes an electromagnetic induction system and a magnetic field resonance system.

The electromagnetic induction system, which is already widely known, can perform power feeding with high efficiency due to a high coupling degree between a power transmitting device for feeding power and a power receiving device for receiving power, whereas power feeding cannot be achieved unless the power transmitting device and power receiving device are located close to each other. On the other hand, the magnetic field resonance system is a system that actively uses a resonance phenomenon, so that the coupling degree between the power transmitting device and the power receiving device may be low, and power feeding can be achieved even when the power transmitting device and the power receiving device are located away from each other to some extent.

The electromagnetic induction system and magnetic field resonance system both perform power feeding by using magnetism. Thus, in both the systems, the power transmitting device has a feeding coil for feeding power by using magnetism, and the power receiving device has a receiving coil for receiving power by using magnetism. The feeding coil and the receiving coil are magnetically coupled to each other, whereby power is fed from the power transmitting device to power receiving device.

When a metallic foreign object enters between the magnetically coupled feeding coil and receiving coil, an eddy current flows in the metallic foreign object by magnetic flux, resulting in heat generation in the metallic foreign object, which deteriorates power feeding efficiency. Thus, it is necessary to detect the metallic foreign object entering between the power transmitting device and the power receiving device.

As a method of detecting the metallic foreign object, there is known a system using a resonance circuit constituted of a coil and a capacitor. For example, Patent Document 1 discloses a device that applies an impulse to a resonance circuit constituted of a coil and a capacitor to detect the metallic foreign object based on a change in a Q-value calculated from the amplitude value and time information of a response waveform (attenuation vibrating wave) to the applied impulse.

Further, Patent Document 2 discloses a device that performs the foreign object detection at timing when the intensity of a magnetic field for power transmission is equal to or less than a predetermined value to allow the presence/absence of the foreign object to be detected even during power transmission.

CITATION LIST

Patent Document

[Patent Document 1] JP 2013-132133 A
[Patent Document 2] JP 2015-211536 A

SUMMARY OF INVENTION

Technical Problem to be Solved by Invention

The above-mentioned magnetic field for power transmission sometimes makes it difficult for the resonance circuit constituted of a coil and a capacitor to detect the foreign object accurately. Particularly, when a switching element for AC to DC or DC to AC conversion is used in a power transmitting device or a power receiving device, a frequency component higher than a power transmission frequency occurs in an alternating magnetic field for power transmission due to the switching, and this high-frequency component acts as noise, making it more difficult to detect the foreign object.

The technique described in Patent Document 2 aims to reduce the influence that the magnetic field for power transmission has on the foreign object detection. However, even this technique cannot reduce the influence when the magnetic field contains a frequency component higher than the power transmission frequency. On the contrary, the timing when the intensity of the magnetic field for power transmission becomes equal to or less than a predetermined value is also timing (i.e., near the zero-cross point) when it is highly likely that superimposition of a high-frequency component due to the switching occurs. Thus, the use of the technique described in Patent Document 2 may increase the influence.

The present invention has been made in view of the above problems, and the object thereof is to improve detection accuracy of the metallic foreign object between a feeding coil and a receiving coil during wireless power feeding.

Means for Solving the Problem

A wireless power transmitting device according to the present invention is a device that performs power transmission by wireless using an alternating magnetic field vibrating at a predetermined power transmission frequency and includes a feeding coil, an antenna coil, a capacitor that constitutes a resonance circuit together with the antenna coil, a noise detection part that detects noise vibrating at a frequency higher than the power transmission frequency, and a foreign object detection part that detects the presence/absence of a metallic foreign object based on a change in voltage or current generated in the resonance circuit and a noise detection result from the noise detection part.

A wireless power receiving device according to the present invention is a device that receives power by wireless using an alternating magnetic field vibrating at a predetermined power transmission frequency and includes a receiving coil, an antenna coil, a capacitor that constitutes a resonance circuit together with the antenna coil, a noise detection part that detects noise vibrating at a frequency higher than the power transmission frequency, and a foreign object detection part that detects the presence/absence of a metallic foreign object based on a change in voltage or current generated in the resonance circuit and a noise detection result from the noise detection part.

According to the present invention, the foreign object detection part detects the presence/absence of the metallic foreign object based on also the noise detection result from the noise detection part, so that it is possible to improve the accuracy of detection of the metallic foreign object between the feeding coil and the receiving coil during wireless power feeding.

In the above wireless power transmitting device, the foreign object detection part may include a drive part that applies voltage to the resonance circuit and a control part that controls the drive part to apply the voltage at timing, which is shown by the noise detection result from the noise detection part, when a distortion does not occur in a vibration signal generated in the resonance circuit and may be configured to detect the presence/absence of the metallic foreign object based on a vibration time length representing the length of time required for vibration corresponding to a predetermined wavenumber larger than 1 of a signal corresponding to a vibration signal generated in the resonance circuit in accordance with the voltage. Further, in the above wireless power receiving device, the foreign object detection part may include a drive part that applies voltage to the resonance circuit and a control part that controls the drive part to apply the voltage at timing, which is shown by the noise detection result from the noise detection part, when a distortion does not occur in a vibration signal generated in the resonance circuit and may be configured to detect the presence/absence of the metallic foreign object based on a vibration time length representing the length of time required for vibration corresponding to a predetermined wavenumber larger than 1 of a signal corresponding to a vibration signal generated in the resonance circuit in accordance with the voltage. With this configuration, the foreign object detection part of a type that detects the presence/absence of the metallic foreign object based on the period of a signal corresponding to the vibration signal generated in the resonance circuit in accordance with voltage can be configured to apply voltage at timing, which is shown by the noise detection result from the noise detection part, when noise does not occur, making it possible to improve the accuracy of detection of the metallic foreign object between the feeding coil and the receiving coil during wireless power feeding.

In the above wireless power transmitting device, the noise detection part may include at least one noise detection coil. Further, in the above wireless power receiving device, the noise detection part may include at least one noise detection coil. With the above configuration, the noise detection part can detect noise by using a dedicated coil different from the antenna coil. Further, using the coil for noise detection allows an AC magnetic field to be directly measured, making it possible to accurately detect both noise generated in the wireless power transmitting device and noise generated in the wireless power receiving device.

The above wireless power transmitting device may further include a switching part that switches a connection state between the antenna coil and the capacitor, wherein the noise detection part may detect the noise based on a signal generated in the antenna coil, and the switching part may connect the antenna coil and the capacitor during the detection of the presence/absence of the metallic foreign object by the foreign object detection part, while it may disconnect the capacitor from the antenna coil during the noise detection by the noise detection part. Further, the above wireless power receiving device may further include a switching part that switches a connection state between the antenna coil and the capacitor, wherein the noise detection part may detect the noise based on a signal generated in the antenna coil, and the switching part may connect the antenna coil and the capacitor during the detection of the presence/absence of the metallic foreign object by the foreign object detection part, while it may disconnect the capacitor from the antenna coil during the noise detection by the noise detection part. With this configuration, the antenna coil can be used as a noise detection coil.

In the above wireless power transmitting device, the foreign object detection part may be configured to discard the result of the detection of the presence/absence of the metallic foreign object executed based on a change in voltage or current generated in the resonance circuit when noise is detected by the noise detection part. Further, in the above wireless power receiving device, the foreign object detection part may be configured to discard the result of the detection of the presence/absence of the metallic foreign object executed based on a change in voltage or current generated in the resonance circuit when noise is detected by the noise detection part. With this configuration, only a detection result that is not affected by noise can be adopted, making it possible to improve the accuracy of detection of the metallic foreign object between the feeding coil and the receiving coil during wireless power feeding.

Further, a wireless power transmission system according to an aspect of the present invention is a system that transmits power by wireless from a feeding coil to a receiving coil and includes a wireless power transmitting device having the feeding coil and a wireless power receiving device having the receiving coil. The wireless power transmitting device is any one of the above-described wireless power transmitting devices.

Further, a wireless power transmission system according to another aspect of the present invention is a system that transmits power by wireless from a feeding coil to a receiving coil and includes a wireless power transmitting device having the feeding coil and a wireless power receiving device having the receiving coil. The wireless power receiving device is any one of the above-described wireless power receiving devices.

Advantageous Effects of the Invention

According to the present invention, it is possible to improve the accuracy of detection of the metallic foreign object between the feeding coil and the receiving coil during wireless power feeding.

BRIEF DESCRIPTION OF DRAWINGS

FIGS. 3A to 3I are views illustrating the waveforms of controls signals SG1-SG4, an output voltage O1, voltages V1 and V2, and currents I1 and I2 illustrated in FIG. 2.

MODE FOR CARRYING OUT THE INVENTION

Figure 1:
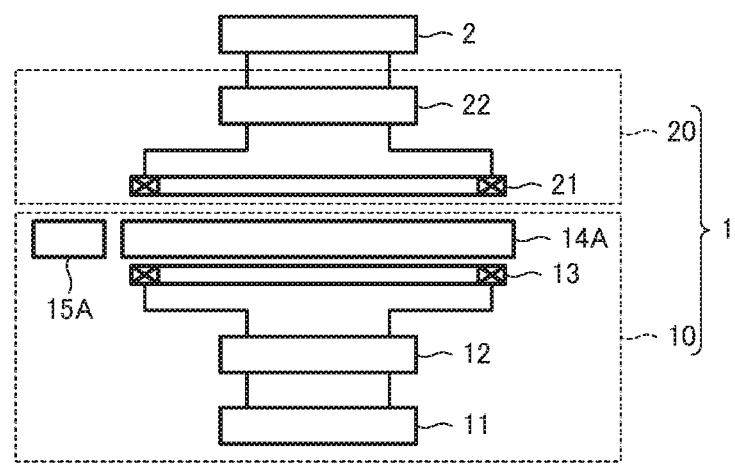
FIG. 1 is a view illustrating the schematic configuration of a wireless power transmission system 1 according to a first embodiment of the present invention and a load 2 connected to the wireless power transmission system 1.

Hereinafter, embodiments of the present invention will be described in detail with reference to the accompanying drawings. The present invention is not limited by the content described below. Further, constituent elements of the following embodiments include those easily occur to those skilled in the art, and include those substantially identical or equivalent in the scope thereof. Furthermore, in the following description, the same reference numerals are given to the same elements or elements having the same function, and repeated description will be omitted.

First Embodiment

FIG. 1 is a view illustrating the schematic configuration of a wireless power transmission system 1 according to the first embodiment of the present invention and a load 2 connected to the wireless power transmission system 1. As illustrated, the wireless power transmission system 1 includes a wireless power transmitting device 10 and a wireless power receiving device 20. The load 2 is connected to the wireless power receiving device 20.

The wireless power transmission system 1 is a system used for power feeding to a moving body such as an electric vehicle (EV) or a hybrid vehicle (HV) that utilizes power from a secondary battery. In this case, the wireless power transmitting device 10 is mounted in power feeding facility installed on the ground, and the wireless power receiving device 20 is mounted on the vehicle. The following description will be given assuming that the wireless power transmission system 1 is a system for power feeding to the electric vehicle.

Figure 2:
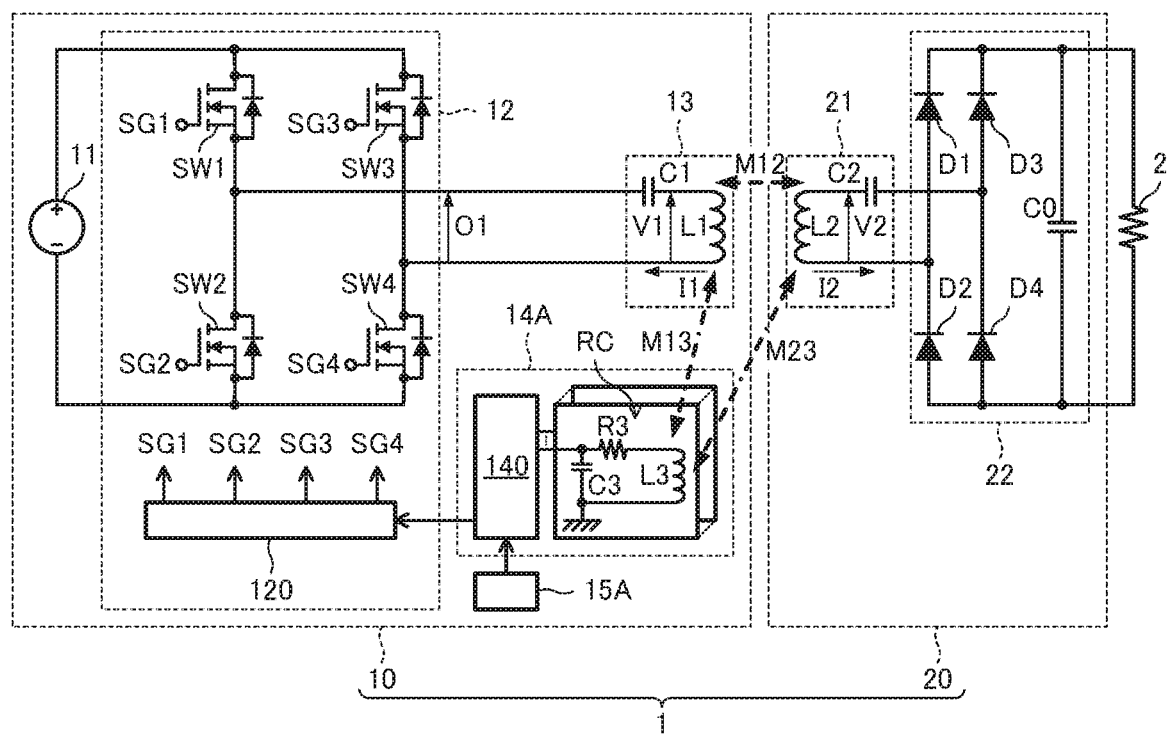
FIG. 2 is a view illustrating the internal circuit configurations of the wireless power transmitting device 10 and wireless power receiving device 20 illustrated in FIG. 1, respectively.

FIG. 2 is a view illustrating the internal circuit configurations of the wireless power transmitting device 10 and wireless power receiving device 20, respectively. Hereinafter, with reference to FIGS. 1 and 2, the outline of the configuration of the wireless power transmission system 1 will be described first, followed by detailed description of the characteristic configuration of the present invention.

As illustrated in FIGS. 1 and 2, the wireless power transmitting device 10 includes a DC power supply 11, a power converter 12, a feeding coil part 13, a metallic foreign object detector 14A, and a noise detection part 15A.

The DC power supply 11 supplies DC power to the power converter 12. The DC power supply 11 is not particularly limited in type as long as it can supply DC power. For example, a DC power supply obtained by rectifying/smoothing a commercial AC power supply, a secondary battery, a DC power supply generated by solar power, and a switching power supply such as a switching converter can be suitably used as the DC power supply 11.

The power converter 12 is an inverter that converts the DC power supplied from the DC power supply 11 into AC power to thereby supply AC current I1 illustrated in FIG. 2 to the feeding coil part 13. Specifically, as illustrated in FIG. 2, the power converter 12 includes a switching circuit (full-bridge circuit) including a plurality of bridge-connected switching elements SW1 to SW4 and a switch drive part 120. Although the switching circuit in the power converter 12 is constituted by the full-bridge circuit in this example, other type of switching circuit may be used.

The switching elements SW1 to SW4 are configured to perform ON/OFF operation independently of each other by control signals SG1 to SG4 supplied from the switch drive part 120 to the gates thereof, respectively. A MOSFET (Metal Oxide Semiconductor Field Effect Transistor) and an IGBT (Insulated Gate Bipolar Transistor) can be suitably used as the switching elements SW1 to SW4.

The switch drive part 120 is a signal generation part that generates the control signals SG1 to SG4 so that the output voltage O1 of the switching circuit including the switching elements SW1 to SW4 becomes a rectangular AC voltage signal vibrating at a predetermined period. Accordingly, the rectangular AC voltage signal vibrating at a predetermined period is supplied to a feeding coil L1 to be described later. Hereinafter, the inverse of the predetermined period is referred to as "power transmission frequency fp". The value of the power transmission frequency fp is set to, e.g., 20 [kHz] to 200 [kHz].

FIGS. 3A to 3E are views illustrating the waveforms of the controls signals SG1, SG4, SG3, and SG2 and the waveform of the output voltage O1, respectively. In FIGS. 3A to 3E, a period during which the signals are "ON" corresponds to a period during which the corresponding switching elements are in a closed state, and a period during which the signals are "OFF" corresponds to a period during which the corresponding switching elements are in an opened state. As illustrated, the control signals SG1 to SG4 are rectangular wave signals vibrating at the power transmission frequency fp, and the control signals SG1 and SG4 differ in phase from the control signals SG2 and SG3 by 180°. As a result, the output voltage O1 is also a rectangular wave signal vibrating at the power transmission frequency fp.

Referring back to FIG. 2, the feeding coil part 13 is a resonance circuit (feeding side resonance circuit) including a feeding side capacitor C1 and a feeding coil L1 which are connected in series and generates an alternating magnetic field based on the AC voltage supplied from the power converter 12. The resonance frequency of the feeding side resonance circuit constituting the feeding coil part 13 is set to a frequency equal or close to the above-mentioned power transmission frequency fp. The feeding side capacitor C1 may be connected parallel to the feeding coil L1.

The feeding coil L1 is a spiral structure coil formed by planarly winding, by about several turns to about several tens of turns, a litz wire obtained by twisting about two thousand insulated copper wires each having a diameter of $\phi 0.1$ (mm) and is disposed, e.g., in or near the ground. When AC voltage is supplied from the power converter 12 to the feeding coil L1, the AC current I1 illustrated in FIG. 2 flows in the feeding coil L1, whereby the alternating magnetic field is generated. The alternating magnetic field causes electromotive force to be generated in a receiving coil L2 to be described later by a mutual inductance M12 between the feeding coil L1 and the receiving coil L2, whereby power transmission is achieved.

FIGS. 3F and 3G are views illustrating the waveform of voltage V1 between both ends of the feeding coil L1 and the waveform of the current I1 flowing in the feeding coil L1, respectively. As illustrated, the voltage V1 and current I1 are substantially sine wave signals vibrating at the power transmission frequency fp. This is because a high-frequency component is filtered by the resonance circuit constituted of the feeding side capacitor C1 and the feeding coil L1.

Figure 4A:
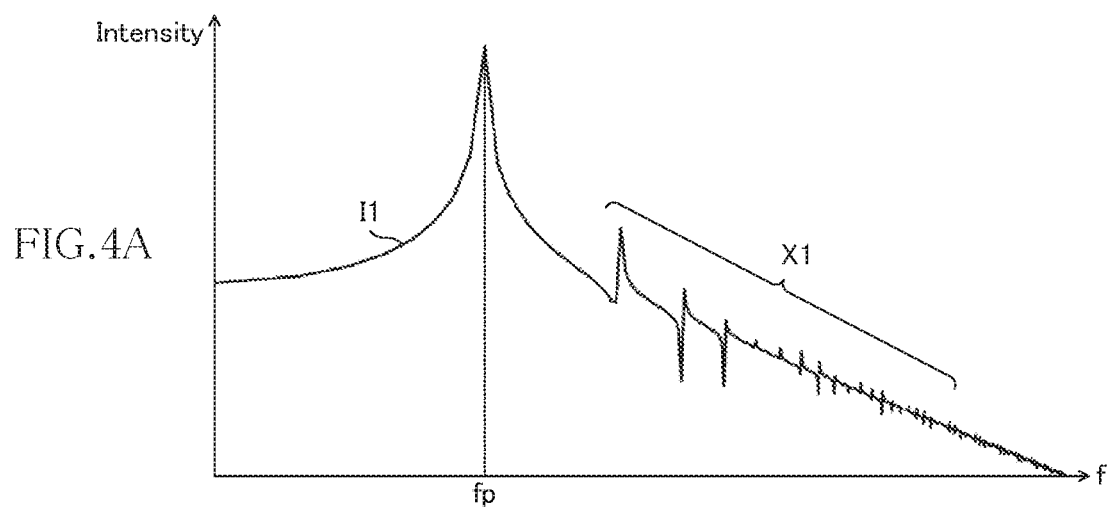
FIGS. 4A and 4B are views illustrating the frequency spectrum of the currents I1 and I2 illustrated in FIG. 2.

FIG. 4A is a view illustrating the frequency spectrum of the current I1. As illustrated, the current I1 has many peaks in a frequency band higher than the power transmission frequency fp. That is, the current I1 is not a perfect sine wave, but contains many high-frequency components. This corresponds mainly to a fact that a high-frequency component occurs in the voltage V1 at the switching timing of the switching elements SW1 to SW4, as illustrated in FIG. 3F. The high-frequency component is superimposed on the alternating magnetic field generated by the feeding coil part 13 to exert influence on a signal waveform appearing in a resonance circuit RC (to be described later) of the metallic foreign object detector 14A. One of the objects of the present invention is to suppress deterioration in metallic foreign object detection accuracy by the metallic foreign object detector 14A caused due to the influence.

Referring back to FIG. 2, the metallic foreign object detector 14A is a device having a function of detecting the presence/absence of a metallic foreign object approaching the feeding coil L1 and includes a plurality of resonance circuits RC each including an antenna coil L3 and a capacitor C3 for metallic foreign object detector, and a foreign object detection part 140 connected to the resonance circuits RC. A resistor R3 illustrated in FIG. 2 is a series resistor of the antenna coil L3.

The metallic foreign object detector 14A is provided for the purpose of detecting a metallic foreign object existing between the feeding coil L1 and the receiving coil L2. Thus, as illustrated in FIG. 1, at least apart (specifically, antenna coils L3) of the metallic foreign object detector 14A is disposed on the surface of the feeding coil L1 opposed to the receiving coil L2, i.e., between the feeding coil L1 and the receiving coil L2. The metallic foreign object detector 14A and feeding coil L1 may be formed as an integrated unit or as separate units.

The noise detection part 15A is configured to detect a signal (hereinafter, referred to as "noise") having a frequency higher than the power transmission frequency fp. The specific configuration of the noise detection part 15A is not particularly limited and, for example, the noise detection part 15A may include a current detection circuit that detects a current waveform flowing in the feeding coil L1, a high-pass filter that extracts only a high-frequency component from an output signal from the current detection circuit, and a synchronization signal generation part that issues a synchronization signal when the amplitude of the output signal of the high-pass filter exceeds a predetermined value, i.e., during the generation period of the high-frequency component. In place of the current detection circuit, a voltage detection circuit such as a resistance-voltage dividing circuit may be used. The cut-off frequency of the high-pass filter is preferably set to a frequency higher than the power transmission frequency fp. Besides, the noise detection part 15A may be configured by disposing a magnetic sensor such as a hall element or a magnetoresistance effect element between the feeding coil L1 and the receiving coil L2.

The wireless power receiving device 20 includes a receiving coil part 21 and a rectifier 22, as illustrated in FIGS. 1 and 2.

As illustrated in FIG. 2, the receiving coil part 21 includes a resonance circuit (receiving side resonance circuit) including a receiving side capacitor C2 and a receiving coil L2 which are connected in series and plays a role as a power receiving part that receives AC power transmitted from the feeding coil L1 by wireless. The resonance frequency of the receiving side resonance circuit constituting the receiving coil part 21 is also set to a frequency equal or close to the above-mentioned power transmission frequency fp. The receiving side capacitor C2 may be connected parallel to the receiving coil L2.

Like the feeding coil L1, the receiving coil L2 is a spiral structure coil formed by planarly winding, by about several turns to about several tens of turns, a litz wire obtained by twisting about two thousand insulated copper wires each having a diameter of $\phi 0.1$ (mm). On the other hand, the mounting position of the receiving coil L2 differs from that of the feeding coil L1 and, for example, the receiving coil L2 is mounted to the lower portion of the body of an electric vehicle. When magnetic flux generate by the feeding coil L1 interlinks the receiving coil L2, electromotive force by electromagnetic induction is generated in the receiving coil L2, whereby AC current I2 illustrated in FIG. 2 flows in the receiving coil L2. The AC current I2 is converted into DC current by the rectifier 22 and is then supplied to the load 2. Thus, the DC power can be supplied to the load 2.

The rectifier 22 is a circuit that rectifies the AC current output from the receiving coil part 21 into DC current to supply DC power to the load 2. Specifically, as illustrated in FIG. 2, the rectifier 22 includes a bridge circuit including four bridge-connected diodes D1 to D4 and a smoothing capacitor C0 connected parallel to the bridge circuit.

FIGS. 3H and 3I are views illustrating the waveform of voltage V2 between both ends of the receiving coil L2 and the waveform of current I2 flowing in the receiving coil L2, respectively. As illustrated, the voltage V2 and current I2 are substantially sine wave signals vibrating at the power transmission frequency fp like the voltage V1 and current I1. This is because a high-frequency component is filtered by the resonance circuit constituted of the receiving side capacitor C2 and the receiving coil L2. However, the voltage V2 and the current I2 slightly (by a period a little longer than ¼ period in the example of FIGS. 3H and 3I) lag behind the voltage V1 and the current I1, respectively.

Figure 4B:
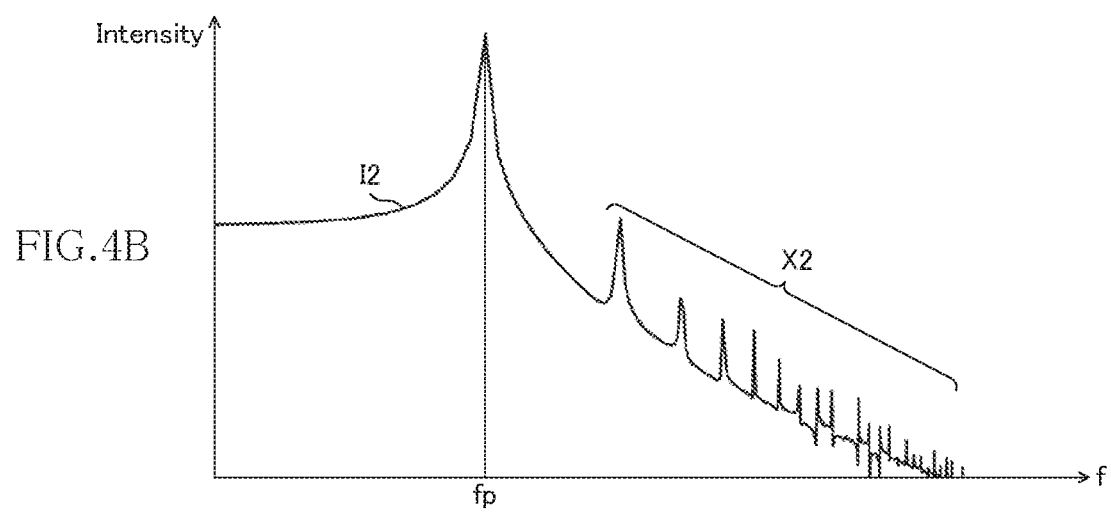

FIG. 4B is a view illustrating the frequency spectrum of the current I2. As illustrated, the current I2 has many peaks in a frequency band higher than the power transmission frequency fp like the current I1. That is, the current I2 is not a perfect sine wave, but contains many high-frequency components. This corresponds mainly to a fact that a high-frequency component due to the switching of current paths flowing in the diodes D1 to D4 occurs in the voltage V2, as illustrated in FIG. 3H. The high-frequency component is superimposed on the alternating magnetic field generated by the feeding coil part 13 to exert influence on a signal waveform appearing in a resonance circuit RC (to be described later) of the metallic foreign object detector 14A. To suppress deterioration in metallic foreign object detection accuracy by the metallic foreign object detector 14A caused due to the influence is also one of the objects of the present invention.

The load 2 includes a charger and a battery which are not illustrated. The charger is a circuit that charges the battery based on the DC power output from the rectifier 22. The charging is executed by, e.g., constant-voltage/constant-current charging (CVCC charging). The battery is not particularly limited in type as long as it can store power. For example, a secondary battery (lithium-ion battery, a lithium-polymer battery, a nickel battery, etc.) and a capacitive element (electric double-layer capacitor, etc.) can be suitably used as the battery constituting the load 2.

Figure 5A:
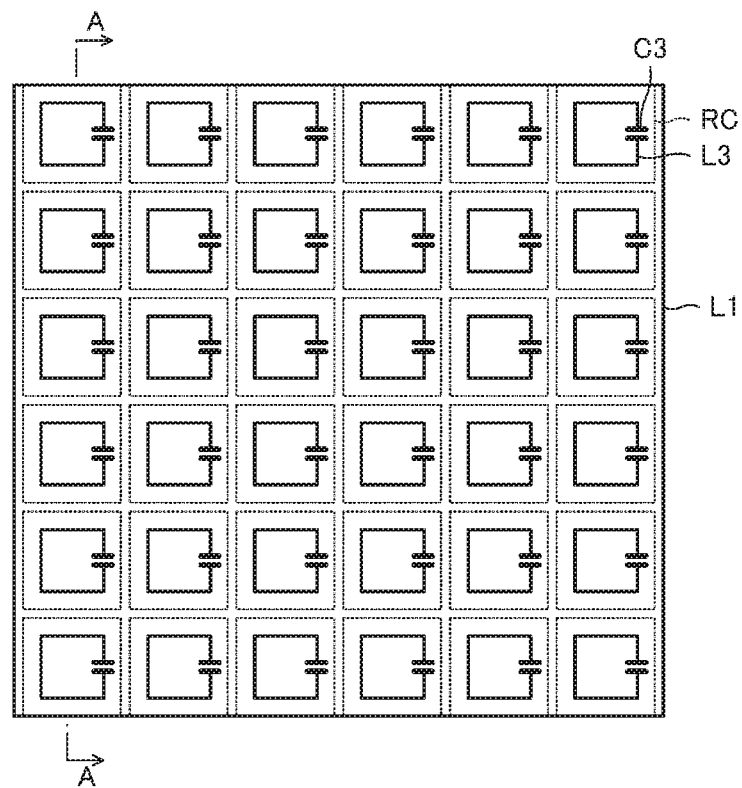
FIG. 5A is a plan view illustrating the positional relationship between the feeding coil L1 and the antenna coils L3 illustrated in FIG. 2.
Figure 5B:
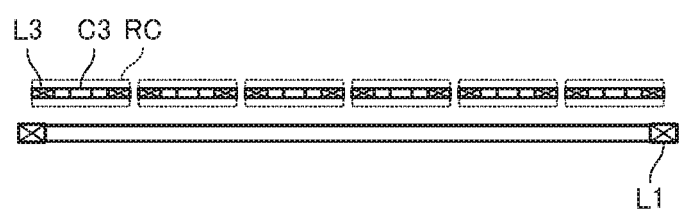
FIG. 5B is a cross-sectional view of the feeding coil L1 and antenna coils L3 taken along line A-A in FIG. 5A.
Figure 6:
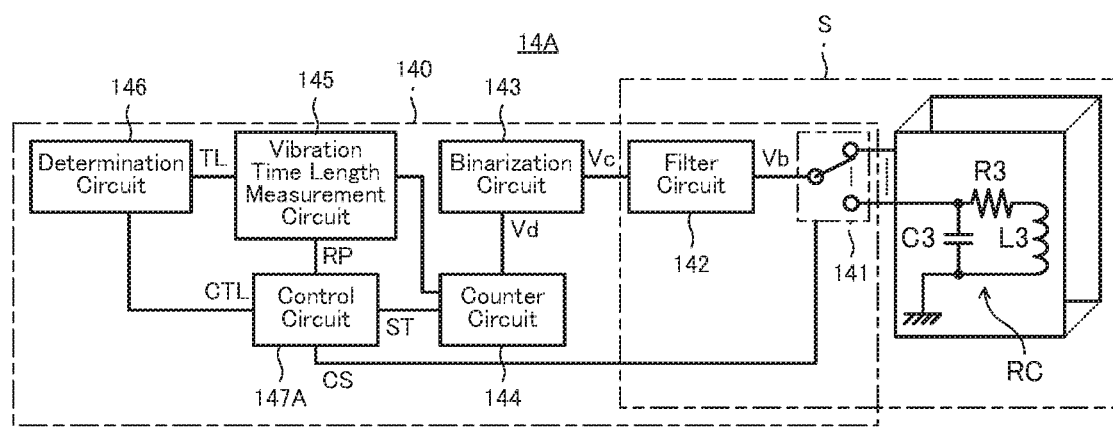
FIG. 6 is a schematic block diagram illustrating the functional block of the metallic foreign object detector 14A illustrated in FIG. 2.

The following describes details of the metallic foreign object detector 14A with reference to FIGS. 5A and 5B and FIG. 6. FIG. 5A is a plan view illustrating the positional relationship between the feeding coil L1 and the antenna coils L3, and FIG. 5B is a cross-sectional view of the feeding coil L1 and antenna coils L3 taken along line A-A in FIG. 5A. FIG. 6 is a schematic block diagram illustrating the functional block of the metallic foreign object detector 14A.

In FIGS. 5A and 5B, as viewed from above, the plurality of resonance circuits RC provided in the metallic foreign object detector 14A are arranged in a matrix within an area corresponding to the inside of the feeding coil L1. Such an arrangement of the resonance circuits RC can be realized by placing, on the feeding coil L1, a printed board (not illustrated) on the surface of which a conductive coil pattern is formed.

With the above arrangement, when the above-mentioned alternating magnetic field (magnetic filed vibrating at the power transmission frequency fp) occurs in the feeding coil L1, electromotive force is induced in the antenna coils L3 by a mutual inductance M13 between the feeding coil L1 and the antenna coils L3 illustrated in FIG. 2 and a mutual inductance M23 between the receiving coil L2 and the antenna coils L3 illustrated in FIG. 2. The electromotive force generates a vibration signal Vb (see FIG. 6) in the antenna coils L3. That is, the antenna coils L3 according to the present embodiment are configured to generate the vibration signal Vb by receiving a magnetic field.

The vibration signal Vb generated in each antenna coil L3 contains, in addition to the component of the power transmission frequency fp which is the frequency of the alternating magnetic field, the component of the resonance frequency fr of each resonance circuit RC. The value of the resonance frequency fr is set to a single value extremely higher than the power transmission frequency fp by adjusting the inductance of the antenna coil L3 and the capacitance of the capacitor C3. Specifically, the value of the resonance frequency fr is preferably set to 3000 [kHz]. The capacitance of the capacitor C3 is preferably set to a value of about several hundreds [pF] to several thousands [pF].

Referring to FIG. 6, the foreign object detection part 140 functionally includes a detection changeover switch 141, a filter circuit 142, a binarization circuit 143, a counter circuit 144, a vibration time length measurement circuit 145, a determination circuit 146, and a control circuit 147A. The detection changeover switch 141 and the filter circuit 142 constitute a sensor part S together with each resonance circuit RC.

The detection changeover switch 141 is a one-circuit multicontact type switch having a common terminal connected to the filter circuit 142 and a plurality of selection terminals connected to each resonance circuit RC and is configured to connect one of the selection terminals to the common terminal according to a coil selection signal CS supplied from the control circuit 147A. As the detection changeover switch 141, a semiconductor switch or a multiplexer is preferably used.

The control circuit 147A is a circuit (control part) that generates the coil selection signal CS and supplies it to the detection changeover switch 141 and detects the presence/absence of a metallic foreign object based on a change in voltage or current generated in the resonance circuit RC including the selected antenna coil L3 and a noise detection result from the noise detection part 15A. When detecting the presence/absence of the metallic foreign object, the control circuit 147A supplies a count start signal ST and a reference period designation signal RP to the counter circuit 144 and the vibration time length measurement circuit 145, respectively.

The coil selection signal CS is a signal that designates one of the plurality of antenna coils L3. The control circuit 147A is configured to sequentially select the antenna coils L3 one by one at an equal time interval and supply the coil selection signal CS designating the selected antenna coil L3 to the detection changeover switch 141. As a result, the antenna coils L3 are sequentially connected one by one to the filter circuit 142. After selecting the last antenna coil L3, the control circuit 147A repeats the selection operation from the first antenna coil L3.

The control circuit 147A may be configured to exclude some of the plurality of antenna coils L3 from the selection target coils according to the user's setting or the like. This allows an area to be subjected to the metallic foreign object detection to be narrowed to increase detection time of the metallic foreign object by one antenna coil L3 as compared to a case where all the antenna coils L3 are used.

Hereinafter, the detection of the presence/absence of the metallic foreign object performed by the control circuit 147A will be described in detail, including the operations of other circuits in the foreign object detection part 140. The operation for the foreign object detection described below is executed one or more times by the control circuit 147A while one antenna coil L3 is being selected.

The vibration signal Vb generated in the antenna coil L3 being selected is input to the filter circuit 142 through the detection changeover switch 141. The filter circuit 142 is a circuit that generates a vibration signal Vc by removing the component of the power transmission frequency fp from the vibration signal Vb. Specifically, the filter circuit 142 may be constituted by a band-pass filter that extracts a frequency of the same band as the resonance frequency fr or by a high-pass filter that extracts only the component of a frequency higher than the power transmission frequency fp. Further, the filter circuit 142 may be constituted by an active filter or a passive filter.

The binarization circuit 143 compares the voltage value of the vibration signal Vc output from the filter circuit 142 and a reference voltage value set in advance to generate a binary signal Vd. The binary signal Vd assumes a high level when the voltage value of the vibration signal Vc is equal to or larger than the reference voltage value and assumes a low level when the voltage value of the vibration signal Vc is smaller than the reference voltage value.

The counter circuit 144 counts the wavenumber of the binary signal Vd output from the binarization circuit 143 to thereby count the wavenumber of the vibration signal Vc. The timing at which the counter circuit 144 starts counting is designated by the count start signal ST supplied from the control circuit 147A.

The vibration time length measurement circuit 145 is a circuit that measures a vibration time length TL indicating the length of time required for the vibration of the vibration signal Vc (signal corresponding to the vibration signal Vb generated in the resonance circuit) corresponding to a predetermined wavenumber larger than 1. The wavenumber mentioned here is equivalent to the period of the vibration signal Vc. Specifically, the vibration time length measurement circuit 145 measures a time length from when the count value of the counter circuit 144 reaches a first count value to when the count value of the counter circuit 144 reaches a second count value and outputs the measurement result as the vibration time length TL. The first and second count values are designated by the reference period designation signal RP supplied from the control circuit 147A. The vibration time length TL output from the vibration time length measurement circuit 145 is supplied to the determination circuit 146.

The determination circuit 146 is a function part that compares the vibration time length TL supplied from the vibration time length measurement circuit 145 and a criterion time length CTL set in advance in the control circuit 147A and, based on the comparison result, detects the presence/absence of the metallic foreign object between the feeding coil L1 and the receiving coil L2. Specifically, for example, when the difference between the vibration time length TL and the criterion time length CTL is equal to or larger than a predetermined value, the presence of the metallic foreign object is determined, and otherwise, the absence thereof is determined. The determination result is transmitted to a control part (not illustrated) that controls the entire system in the wireless power transmission system 1 through the control circuit 147A. The control part stops power conversion performed by the power converter 12 illustrated in FIG. 2 when the presence of the metallic foreign object is determined. That is, the control part controls the generation of the control signals SG1 to SG4 performed by the switch drive part 120 illustrated in FIG. 2 so as not to allow AC power to be output from the power converter 12. As a result, power feeding operation of the wireless power transmitting device 10 is stopped, making it possible to prevent an eddy current from occurring in the metallic foreign object due to the alternating magnetic field generated between the feeding coil L1 and the receiving coil L2, which in turn prevents the metallic foreign object from generating heat.

The control circuit 147A activates the count start signal ST based on the noise detection result from the noise detection part 15A to determine the timing of instructing the counter circuit 144 to start counting and the first and second count values to be notified to the vibration time length measurement circuit 145 in the form of the reference period designation signal RP. In the present embodiment, improvement in the accuracy of detection of the metallic foreign object between the feeding coil L1 and the receiving coil L2 during wireless power feeding is achieved by the above determination. Hereinafter, detailed description will be given with reference also to FIGS. 7A to 7E.

Figure 7:
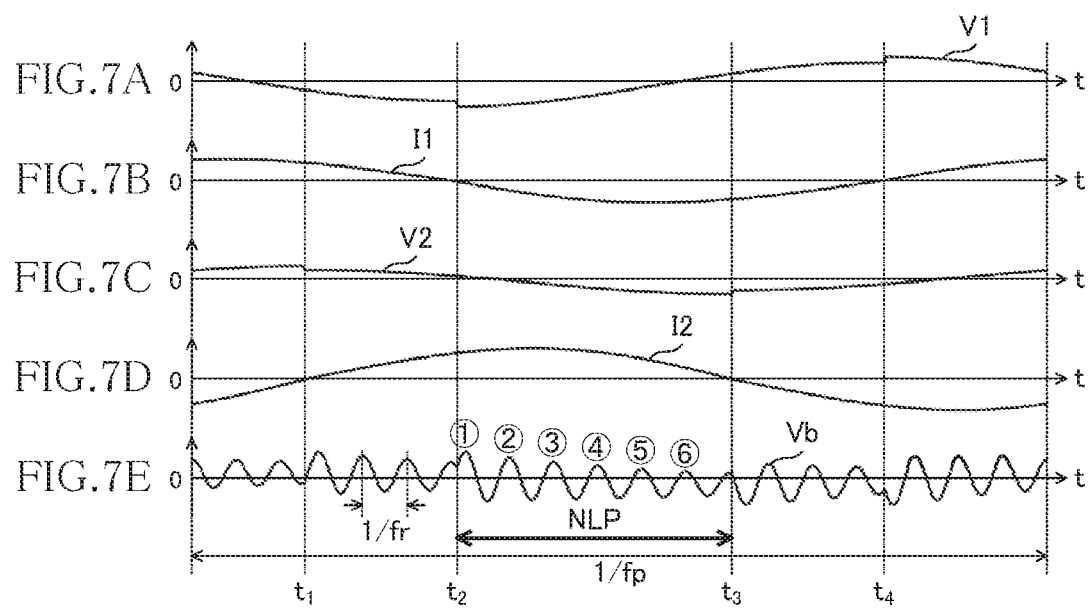
FIGS. 7A to 7E are views illustrating the waveforms of the voltage V1, V2, current I1, I2, and vibration signal Vb, respectively illustrated in FIG. 2.

FIGS. 7A to 7E are views illustrating the waveforms of the voltage V1, V2, current I1, I2, and vibration signal Vb, respectively. FIGS. 7A to 7E represent one period of the power transmission frequency fp. As described above, while the vibration signal Vb contains the component of the resonance frequency fr of the resonance circuit RC as described above, it contains many other frequency components as illustrated in FIG. 7E. Particularly, at timing (times $t_1$, $t_2$, $t_3$, and $t_4$, in the example of FIGS. 7A to 7E) when a high frequency component is superimposed on the voltage V1 and V2, a large distortion (distortion caused due to the alternating magnetic field for power transmission) occurs in the waveform of the vibration signal Vb. Such a distortion causes reduction in the accuracy of detection of the foreign object. Thus, the control circuit 147A determines the activation timing of the count start signal ST and first and second count values such that the metallic foreign object detection is performed at timing when such a distortion does not occur.

More specifically, the control circuit 147A predicts timing when a large distortion due to the alternating magnetic field for power transmission does not occur in the vibration signal Vb from the history of the noise detection result obtained by the noise detection part 15A. In the example of FIGS. 7A to 7E, a period between the time $t_2$ and the time $t_3$ (hereinafter, referred to as "noiseless period NLP") corresponds to the timing when a large distortion due to the alternating magnetic field for power transmission does not occur in the vibration signal Vb. The noiseless period NLP is caused by the switching of the switching elements SW1 to SW4 and thus appears periodically. The control circuit 147A acquires the appearance period of the periodically appearing noiseless period NLP from the history of the noise detection result to predict the appearance timing of the next noiseless period NLP. Then, based on the prediction result, the control circuit 147A determines the activation timing of the count start signal ST and first and second count values such that the detection of the metallic foreign object is performed within the next noiseless period NLP.

Specifically, for example, the control circuit 147A may activate the count start signal ST immediately after the start of the noiseless period NLP. Further, the first count value may be set to, e.g., 2. The reason that the first count value is set not to 1, but to 2 is that the distortion may remain in the vibration signal Vb immediately after the start of the noiseless period NLP. Further, the second count value may be determined such that the period of detection of the metallic foreign object does not exceed the noiseless period NLP. Specifically, the wavenumber of the vibration signal Vc expected to be included within the noiseless period NLP is calculated from the time length of the noiseless period NLP and resonance frequency fr of the resonance circuit RC, and the second count value is set to a value that does not exceed the calculation result. For example, in FIGS. 7A to 7E, the wavenumber of the vibration signal Vc expected to be included within the noiseless period NLP is 6 (corresponding to circled numbers 1 to 6), so that the second count value may be set to a value that does not exceed 6.

The control circuit 147A thus determines the activation timing of the count start signal ST and first and second count values, and whereby the detection of the metallic foreign object is performed within the noiseless period NLP during which a large distortion due to the alternating magnetic field for power transmission does not occur in the vibration signal Vb. Thus, it is possible to improve the accuracy of detection of the metallic foreign object between the feeding coil L1 and the receiving coil L2 during wireless power feeding.

As described above, according to the wireless power transmitting device 10 of the present embodiment, the foreign object detection part 140 detects the presence/absence of the metallic foreign object based on the noise detection result from the noise detection part 15A, making it possible to improve the accuracy of detection of the metallic foreign object between the feeding coil L1 and the receiving coil L2 during wireless power feeding. More specifically, the control circuit 147A determines the activation timing of the count start signal ST and first and second count values such that the detection of the metallic foreign object is performed within the noiseless period NLP during which a large distortion due to the alternating magnetic field for power transmission does not occur in the vibration signal Vb, so that it is possible to improve the accuracy of detection of the metallic foreign object between the feeding coil L1 and the receiving coil L2 during wireless power feeding.

Further, according to the wireless power transmitting device 10 of the present embodiment, the control circuit 147A predicts the noiseless period NLP from the history of the noise detection result, so that even if noise due to a factor other than the switching of the switching elements SW1 to SW4 occurs, it is possible to perform the detection of the metallic foreign object while avoiding the noise as long as the noise is periodical.

Second Embodiment

The following describes the wireless power transmission system 1 according to a second embodiment of the present invention. The wireless power transmission system 1 according to the present embodiment differs from the wireless power transmission system 1 according to the first embodiment in that it uses a metallic foreign object detector 14B in place of the metallic foreign object detector 14A. Other configurations are the same as those of the wireless power transmission system 1 according to the first embodiment, so the same reference numerals are given to the same components as in the first embodiment, and description will be made focusing only on the difference from the first embodiment.

Figure 8:
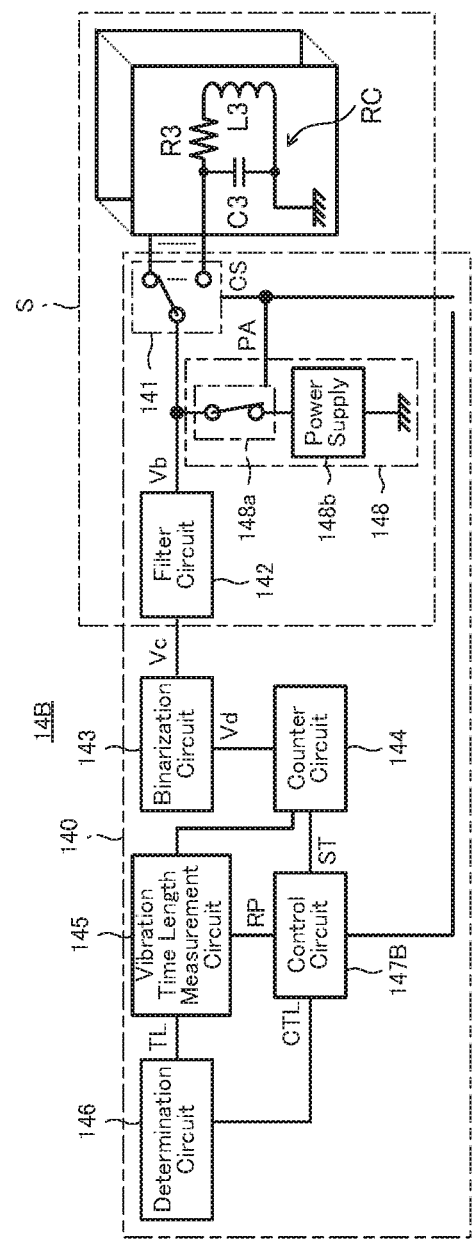
FIG. 8 is a schematic block diagram illustrating the functional block of the metallic foreign object detector 14B according to a second embodiment of the present invention.
Figure 9:
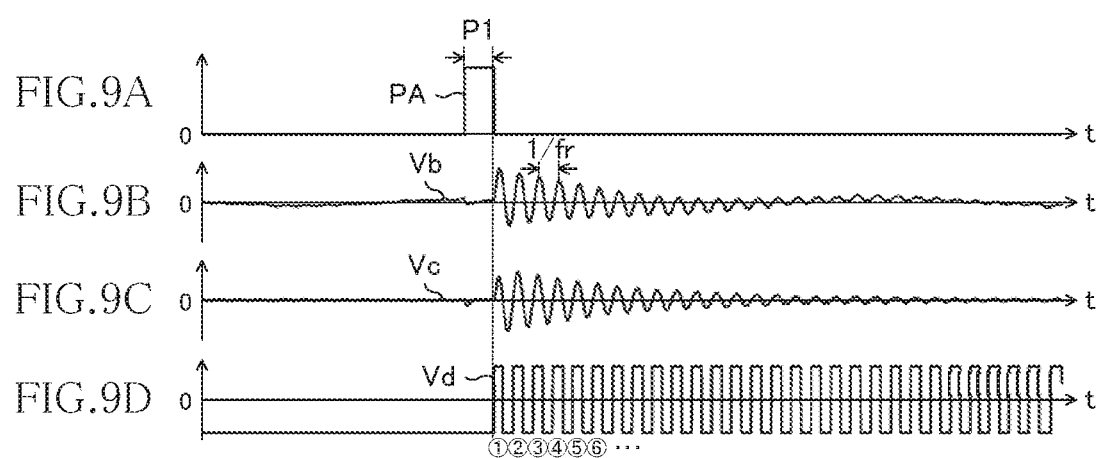
FIGS. 9A to 9D are views illustrating the waveforms of the pulse application signal PA, vibration signals Vb, Vc, and binary signal Vd which are illustrated in FIG. 8.

FIG. 8 is a schematic block diagram illustrating the functional block of the metallic foreign object detector 14B according to the present embodiment. As illustrated, the metallic foreign object detector 14B additionally has a drive circuit 148 in the foreign object detection part 140 and has a control circuit 147B in place of the control circuit 147A. The drive circuit 148 is a circuit (drive part) that supplies voltage to the resonance circuits RC, and each antenna coil L3 is configured to receive the voltage supplied from the drive circuit 148 and thus to generate the vibration signal Vb.

The drive circuit 148 will be described more in detail. As illustrated in FIG. 8, the drive circuit 148 includes a switching circuit 148a and a power supply 148b.

The switching circuit 148a is a one-circuit one-contact type switch having a terminal connected to the power supply 148b and a terminal connected to the common terminal of the detection changeover switch 141 and is configured to perform open/close operation according to a pulse application signal PA supplied from the control circuit 147B. As the switching circuit 148a, a bipolar transistor or a MOSFET is preferably used.

The power supply 148b is a power supply for making current flow in the antenna coil L3 and may be a DC power supply or an AC power supply. The following description will be given assuming that the power supply 148b is a DC power supply. One end of the power supply 148b is connected to the switching circuit 148a, and the other end thereof is grounded.

The control circuit 147B according to the present embodiment performs the control of the switching circuit 148a through the pulse application signal PA, in addition to the control of the detection changeover switch 141 through the coil selection signal CS, the control of the counter circuit 144 through the count start signal ST, and the control of vibration time length measurement circuit 145 through the reference period designation signal RP. Hereinafter, detailed description will be given with reference also to FIGS. 9A to 9D.

FIGS. 9A to 9D are views illustrating the waveforms of the pulse application signal PA, vibration signals Vb, Vc, and binary signal Vd which are illustrated in FIG. 8. When executing the detection of the metallic foreign object, the control circuit 147B first activates the pulse application signal PA during the period P1 illustrated in FIG. 9A. Then, during the period P1, voltage is supplied from the drive circuit 148 to the resonance circuit RC being selected according to the coil selection signal CS. By the supplied voltage, energy is accumulated in the antenna coil L3, and the energy thus accumulated causes the generation of attenuation vibration with a frequency fr in the vibration signal Vb after the pulse application signal PA is inactivated.

Processing for the vibration signal Vb containing the attenuation vibration is the same as that described in the first embodiment. That is, the filter circuit 142 generates the vibration signal Vc by removing the component of the power transmission frequency fp from the vibration signal Vb, the binarization circuit 143 generates the binary signal Vd by comparing the voltage value of the vibration signal Vc and the reference voltage value set in advance, and the counter circuit 144 counts the wavenumber of the binary signal Vd. The timing at which the counter circuit 144 starts counting is controlled by the count start signal ST supplied from the control circuit 147B as in the first embodiment. The control circuit 147B may activate the count start signal ST simultaneously with inactivation of the pulse application signal PA. The subsequent processing by the vibration time length measurement circuit 145 and the control circuit 147B are the same as those described in the first embodiment.

The control circuit 147B according to the present embodiment acquires the timing (the noiseless period NLP illustrated in FIG. 7E) when a large distortion due to the alternating magnetic field for power transmission does not occur in the vibration signal Vb through the same processing as that performed by the control circuit 147A according to the first embodiment. Then, the control circuit 147B determines the activation timing of the pulse application signal PA and first and second count values to be notified to the vibration time length measurement circuit 145 in the form of the reference period designation signal RP such that the foreign object detection is performed within the noiseless period NLP.

Specifically, for example, the control circuit 147B may activate the pulse application signal PA immediately after the start of the noiseless period NLP. By doing this, the control circuit 147B can control the drive circuit 148 to apply voltage at the timing, which is shown by the noise detection result from the noise detection part 15A, when a distortion does not occur in the vibration signal Vb. The first and second count values may be determined in the same manner as in the first embodiment. That is, the first count value may be set to, e.g., 2, and the second count value may be set such that the metallic foreign object detection period does not exceed the noiseless period NLP. In the example of FIGS. 9A to 9D, by setting the first and second count values to 2 and 6, respectively, a period corresponding to the circled numbers 2 to 6 is set to the period during which the metallic foreign object is to be detected.

The control circuit 147B thus determines the activation timing of the pulse application signal PA and first and second count values, and whereby the detection of the metallic foreign object is performed within the noiseless period NLP during which a large distortion due to the alternating magnetic field for power transmission does not occur in the vibration signal Vb. Thus, also in the present embodiment, it is possible to improve the accuracy of detection of the metallic foreign object between the feeding coil L1 and the receiving coil L2 during wireless power feeding.

As described above, according to the wireless power transmitting device 10 of the present embodiment, the control circuit 147B determines the activation timing of the pulse application signal PA and first and second count values such that the detection of the metallic foreign object is performed within the noiseless period NLP during which a large distortion due to the alternating magnetic field for power transmission does not occur in the vibration signal Vb, so that it is possible to improve the accuracy of detection of the metallic foreign object between the feeding coil L1 and the receiving coil L2 during wireless power feeding.

Third Embodiment

The following describes the wireless power transmission system 1 according to a third embodiment of the present invention. The wireless power transmission system 1 according to the present embodiment differs from the wireless power transmission system 1 according to the first embodiment in that it uses a noise detection part 15B in place of the noise detection part 15A. Other configurations are the same as those of the wireless power transmission system 1 according to the first embodiment, so the same reference numerals are given to the same components as in the first embodiment, and description will be made focusing only on the difference from the first embodiment.

Figure 10:
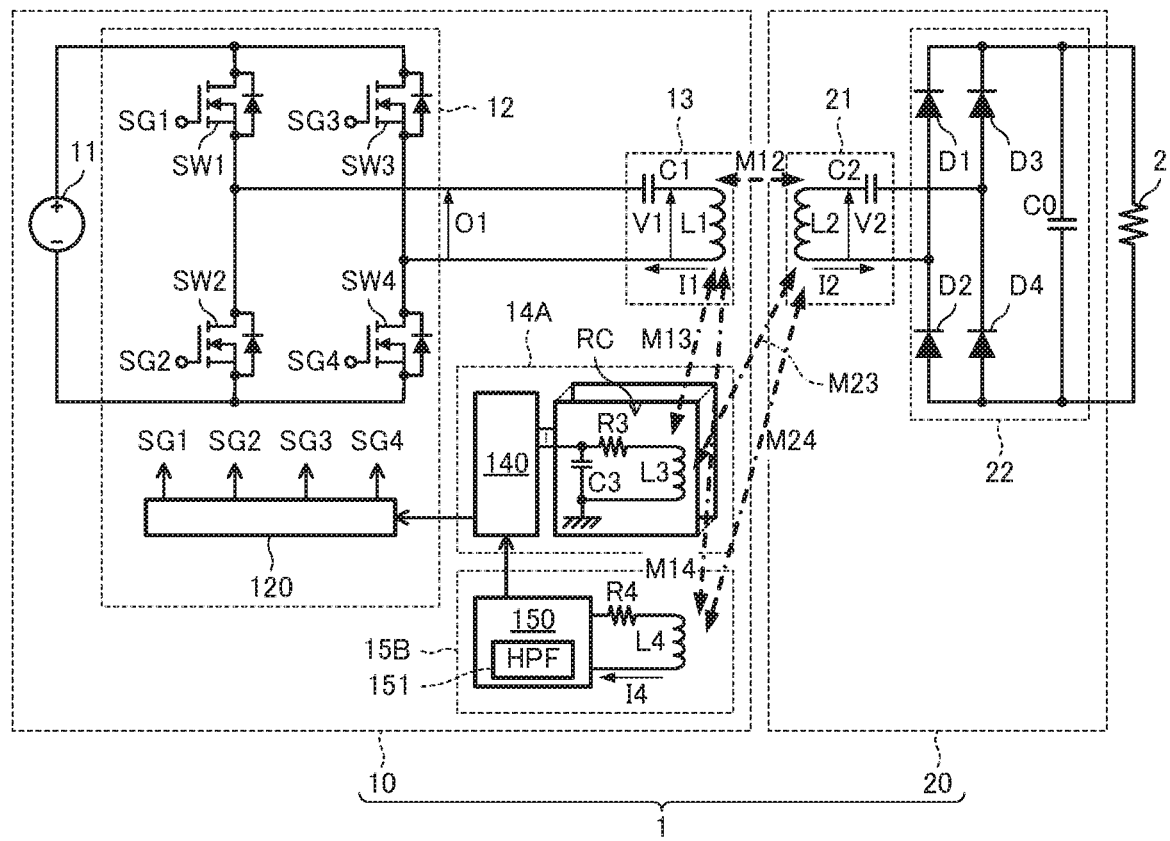
FIG. 10 is a view illustrating the internal circuit configuration of the wireless power transmitting device 10 and that of the wireless power receiving device 20, respectively according to a third embodiment of the present invention.

FIG. 10 is a view illustrating the internal circuit configuration of the wireless power transmitting device 10 and that of the wireless power receiving device 20, respectively. As illustrated, the noise detection part 15B includes a noise detection coil L4 and a detection part 150. A high-pass filter circuit (HPF) 151 is provided in the detection part 150. A resistor R4 illustrated in FIG. 10 is a series resistor of the noise detection coil L4. The number of the noise detection coils L4 may be one or more.

The noise detection coil L4 is disposed in the alternating magnetic field generated during wireless power transmission. Specifically, the noise detection coil L4 is preferably disposed opposite to the feeding coil L1. With this disposition, when the above-mentioned alternating magnetic field (magnetic field vibrating at the power transmission frequency fp) is generated in the feeding coil L1, electromotive force is induced in the noise detection coil L4 by a mutual inductance M14 between the feeding coil L1 and the noise detection coil L4 illustrated in FIG. 10 and a mutual inductance M24 between the receiving coil L2 and the noise detection coil L4 illustrated in FIG. 10. The electromotive force causes AC current I4 to flow in the noise detection coil L4.

Figure 11:
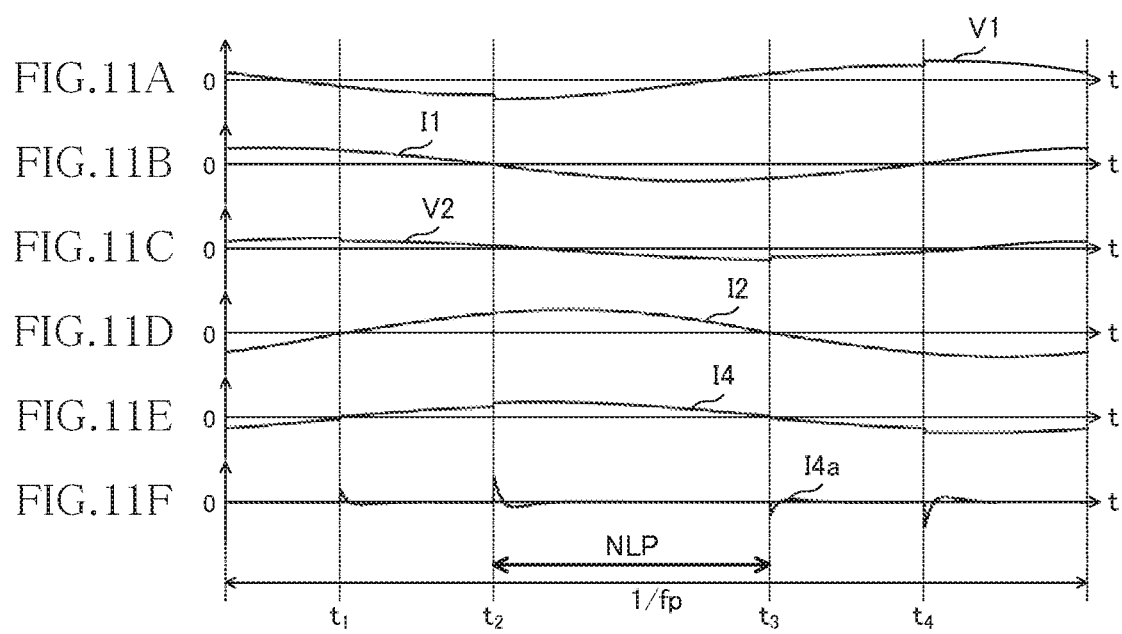
FIGS. 11A to 11F are views illustrating the waveforms of the voltage V1, V2, current I1, I2, I4, and output signal I4a of the high-pass filter circuit 151 which are illustrated in FIG. 10.

The high-pass filter circuit 151 is a circuit that extracts from the AC current I4 only a component (noise component) having a frequency higher than the power transmission frequency fp to generate an output signal I4a (see FIG. 11F). The high-pass filter circuit 151 may also be constituted by an active filter or a passive filter. The output signal I4a generated by the high-pass filter circuit 151 is supplied to the foreign object detection part 140 (specifically, the control circuit 147A illustrated in FIG. 6) as a noise detection result.

FIGS. 11A to 11F are views illustrating the waveforms of the voltage V1, V2, current I1, I2, I4, and output signal I4a of the high-pass filter circuit 151 which are illustrated in FIG. 10. FIGS. 11A to 11F represent one period of the power transmission frequency fp. As illustrated, in the current I4, noise superimposed on the voltage V1, V2 and current I1 and I4 appear due to the switching of the switching elements SW 1 to SW4 and the like in addition to a component vibrating at the power transmission frequency fp. Since the output signal I4a is a signal obtained by removing the component vibrating at the power transmission frequency fp from the current I4, it contains only the noise component as illustrated in FIG. 11F.

The timing (times $t_1$, $t_2$, $t_3$, and $t_4$) at which the noise appears in the output signal I4a coincides with each of the times $t_1$, $t_2$, $t_3$, and $t_4$ illustrated in FIGS. 7A to 7E. This means that the above-described noiseless period NLP can be acquired by referring to the history of the output signal I4a. Thus, the control circuit 147A (see FIG. 6) according to the present embodiment refers to the history of the output signal I4a supplied from the noise detection part 15B to predict the appearance timing of the next noiseless period NLP. The processing by the control circuit 147A after the prediction of the noiseless period NLP is the same as that described in the first embodiment.

As described above, according to the wireless power transmitting device 10 of the present embodiment, the control circuit 147A can predict the appearance timing of the next noiseless period NLP based on the output signal I4a supplied from the noise detection part 15B. Thus, even in the present embodiment, it is possible to improve the detection accuracy of the metallic foreign object between the feeding coil L1 and the receiving coil L2 during wireless power feeding.

In the present embodiment, the wireless power transmitting device 10 has the metallic foreign object detector 14A according to the first embodiment; however, even when the wireless power transmitting device 10 has the metallic foreign object detector 14B according to the second embodiment, the noise detection part 15B can also be used in place of the noise detection part 15A. In this case, the control circuit 147B illustrated in FIG. 8 may predict the appearance timing of the next noiseless period NLP by referring to the history of the output signal I4a supplied from the noise detection part 15B.

Fourth Embodiment

The following describes the wireless power transmission system 1 according to a fourth embodiment of the present invention. The wireless power transmission system 1 according to the present embodiment differs from the wireless power transmission system 1 according to the third embodiment in that it has a metallic foreign object detector 16 integrating the functions of the metallic foreign object detector 14A and of the noise detection part 15B. Other configurations are the same as those of the wireless power transmission system 1 according to the third embodiment, so the same reference numerals are given to the same components as in the third embodiment, and description will be made focusing only on the difference from the third embodiment.

Figure 12:
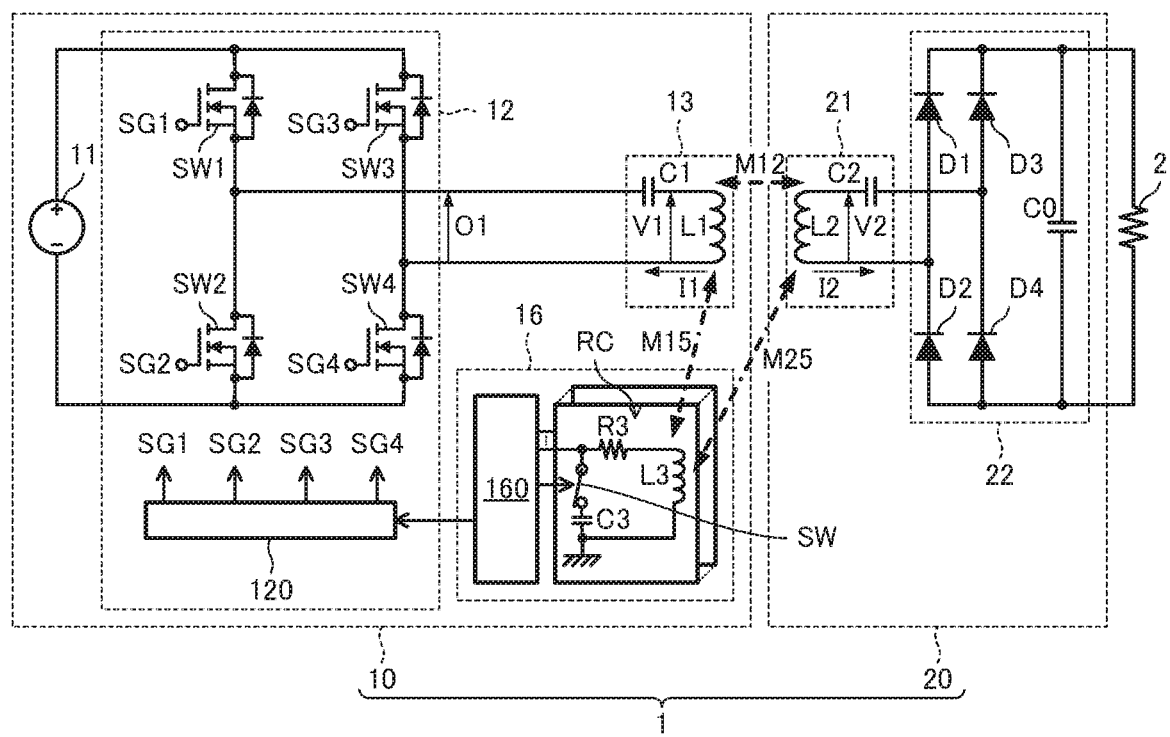
FIG. 12 is a view illustrating the internal circuit configuration of the wireless power transmitting device 10 and that of the wireless power receiving device 20, respectively according to a fourth embodiment of the present invention.

FIG. 12 is a view illustrating the internal circuit configuration of the wireless power transmitting device 10 and that of the wireless power receiving device 20, respectively. The metallic foreign object detector 16 is a device having a function (foreign object detection part) of detecting the presence/absence of the metallic foreign object approaching the feeding coil L1 and a function (noise detection part) of detecting a signal (noise) having a frequency higher than the power transmission frequency fp. As illustrated in FIG. 12, the metallic foreign object detector 16 includes a plurality of resonance circuits RC each including the antenna coil L3 and the capacitor C3 for metallic foreign object detector and a detection part 160 connected to the resonance circuits RC. A resistor R3 illustrated in FIG. 12 is a series resistor of the antenna coil L3.

In the resonance circuit RC according to the present embodiment, a switching part SW for switching a connection state between the antenna coil L3 and the capacitor C3 is provided. The switching part SW connects the antenna coil L3 and the capacitor C3 during the detection of the presence/absence of the metallic foreign object by the foreign object detection function, while it disconnects the capacitor C3 from the antenna coil L3 during the noise detection by the noise detection function. The above operation of the switching part SW is controlled by the detection part 160.

The detection part 160 first executes the noise detection operation by using the noise detection function over a predetermined period of time. Specifically, the detection part 160 controls the switching part SW so as to disconnect the capacitor C3 from the antenna coil L3. Then, the detection part 160 executes the operation (generation of the output signal I4a) of the detection part 150 described in the third embodiment based on the signal received not by the noise detection coil L4 (see FIG. 10) but by the antenna coil L3 and prediction of the noiseless period NLP based on the output signal I4a.

After predicting the appearance timing of the next noiseless period NLP, the detection part 160 executes the detection of the presence/absence of the metallic foreign object by using the foreign object detection function. Specifically, the detection part 160 controls the switching part SW so as to connect the antenna coil L3 and the capacitor C3. Then, the detection part 160 executes the same foreign object detection operation as that performed by the foreign object detection part 140 described in the third embodiment during the acquired noiseless period NLP. Thus, the detection part 160 can perform the foreign object detection within the noiseless period NLP, thus making it possible to improve the detection accuracy of the metallic foreign object between the feeding coil L1 and the receiving coil L2 during wireless power feeding as in the third embodiment.

As described above, according to the present embodiment, the antenna coil L3 can be used also as the noise detection coil. This eliminates the need to provide the noise detection coil L4 illustrated in FIG. 10, allowing reduction in the size of the wireless power transmitting device 10.

Fifth Embodiment

The following describes the wireless power transmission system 1 according to a fifth embodiment of the present invention. The wireless power transmission system 1 according to the present embodiment differs from the wireless power transmission system 1 according to the third embodiment in that the metallic foreign object detector 14A and the noise detection part 15B are provided not in the wireless power transmitting device 10 but in the wireless power receiving device 20. Other configurations are the same as those of the wireless power transmission system 1 according to the third embodiment, so the same reference numerals are given to the same components as in the third embodiment, and description will be made focusing only on the difference from the third embodiment.

Figure 13:
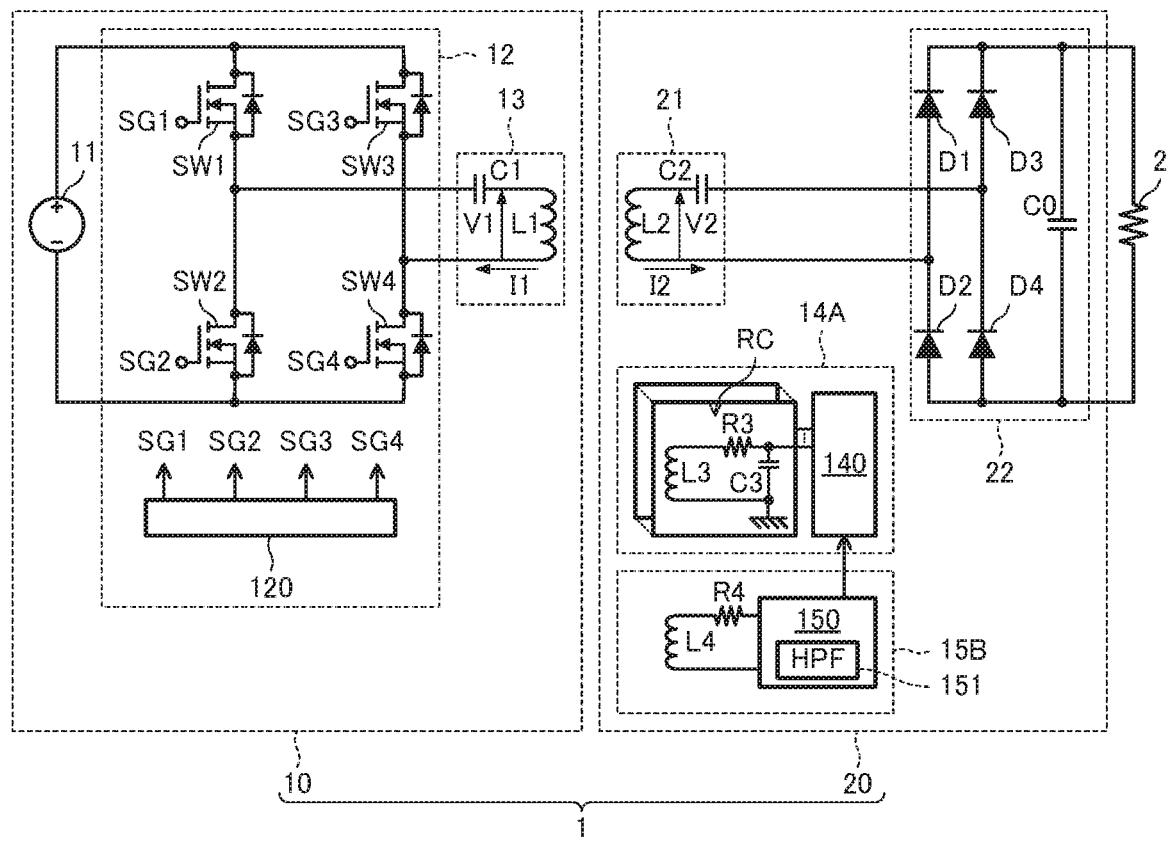
FIG. 13 is a view illustrating the internal circuit configuration of the wireless power transmitting device 10 and that of the wireless power receiving device 20, respectively according to a fifth embodiment of the present invention.

FIG. 13 is a view illustrating the internal circuit configuration of the wireless power transmitting device 10 and that of the wireless power receiving device 20, respectively. As illustrated, the metallic foreign object detector 14A and the noise detection part 15B according to the present embodiment are provided in the wireless power receiving device 20. Also in the present embodiment, the antenna coil L3 and the noise detection coil L4 are disposed between the feeding coil L1 and the receiving coil L2 (inside the alternating magnetic field generated during wireless power transmission).

According to the present embodiment as well, the metallic foreign object detector 14A and the noise detection part 15B can perform the same operations as those described in the third embodiment. Thus, as in the third embodiment, it is possible to improve the accuracy of detection of the metallic foreign object between the feeding coil L1 and the receiving coil L2 during wireless power feeding.

While the preferred embodiment of the present invention has been described, the present invention is not limited to the above embodiment and may be practiced in various forms without departing from the sprit and scope of the present invention.

For example, in the above respective embodiments, the control circuits 147A and 147B predict the timing when a large distortion due to the alternating magnetic field for power transmission does not occur in the vibration signal Vb from the history of the noise detection result from the noise detection part 15A and then perform the metallic foreign object detection based on the prediction. Alternatively, however, the following configuration may be adopted, in which the control circuits 147A and 147B do not perform the prediction, but execute confirmation of the noise detection result from the noise detection part 15A and metallic foreign object detection operation concurrently and discard the detection result of the presence/absence of the metallic foreign object when noise is detected by the noise detection part 15A. That is, the control parts 147A and 14B may regard the detection result of the presence/absence of the metallic foreign object obtained at timing when the noise is detected by the noise detection part 15A as an inadequate result affected by the noise and discard it. Even with this configuration, it is possible to improve the accuracy of detection of the metallic foreign object between the feeding coil L1 and receiving coil L2 during wireless power feeding.

Further, while FIG. 13 illustrates an example in which the metallic foreign object detector 14A and the noise detection part 15B are provided in the wireless power receiving device 20, the metallic foreign object detector 14B (see FIG. 8) may be provided in the wireless power receiving device 20 in place of the metallic foreign object detector 14A, the noise detection part 15A (see FIG. 2) may be provided in the wireless power receiving device 20 in place of the noise detection part 15B, or the metallic foreign object detector 16 (see FIG. 12) may be provided in the wireless power receiving device 20 in place of the metallic foreign object detector 14A and the noise detection part 15B.

Example

Figure 14A:
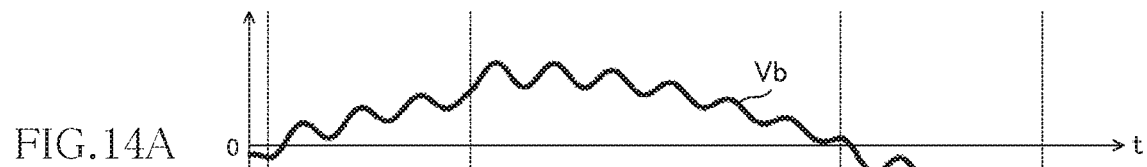
FIGS. 14A to 14C are views illustrating the measurement results of the waveforms of the signals Vb and I4a and a period C in the Example of the present invention.
Figure 14B:
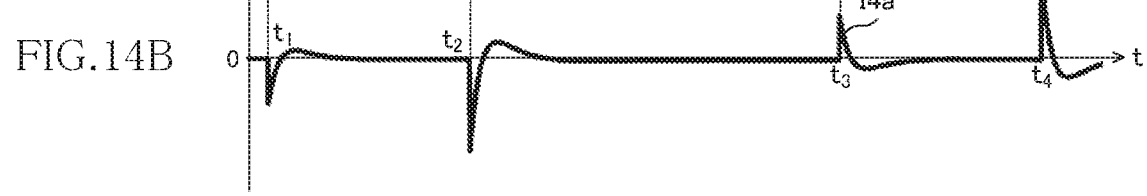
Figure 14C:
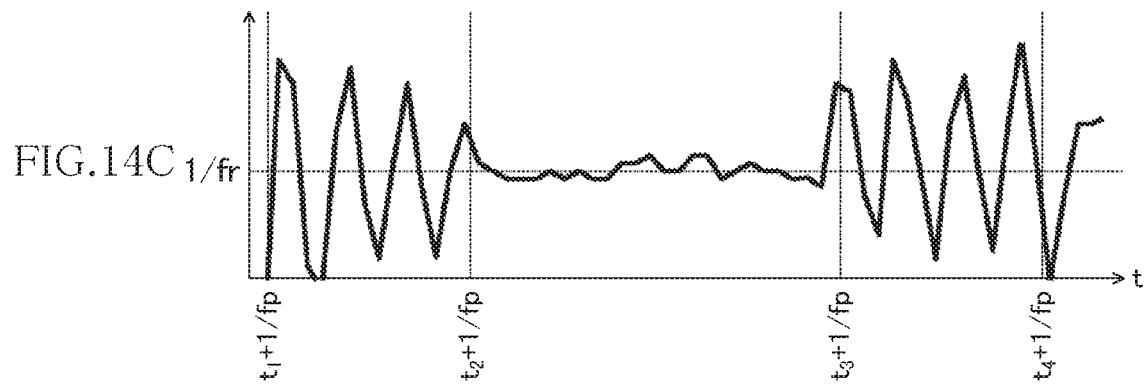

The following describes Example of the present invention with reference to FIGS. 14A to 14C.

FIGS. 14A to 14C are views illustrating the measurement results of the waveforms of the signals Vb and I4a and a period C in the Example of the present invention. When obtaining the measurement results illustrated in FIGS. 14A to 14C, the wireless power transmission system 1 having the configuration illustrated in FIG. 10 was used. Further, before the measurement, the absence of the metallic foreign object between the feeding coil L1 and the receiving coil L2 was confirmed.

DC voltage of 450 V was used as the DC power supply 11. The power transmission frequency fp was set to 89 kHz. Accordingly, the frequency of the ON/OFF operation of the switching elements SW1 to SW4 was also 89 kHz, and the frequency of the alternating magnetic field generated between the feeding coil L1 and the receiving coil L2 was also 89 kHz. The capacity of the feeding side capacitor C1 and that of the receiving side capacitor C2 were set to 7 nF and 18 nF, respectively, and the inductance of the feeding coil L1, that of the receiving coil L2, that of the antenna coil L3, and that of the noise detection coil L4 were set to 500 µH, 200 µH, 0.7 µH, and 0.7 µH, respectively. The capacity of the capacitor C3 was set such that the resonance frequency of the resonance circuit RC constituted of the antenna coil L3 and the capacitor C3 was 1.73 MHz. Further, a resistive element of 27.3Ω was used as the load 2, and the opposing positions of the feeding coil L1 and receiving coil L2 are adjusted such that the power consumption of the load 2 was 3.3 kW. The antenna coil L3 and the noise detection coil L4 are disposed near and opposite to the feeding coil L1.

Further, DC voltage of 5V was used as the power supply 148b illustrated in FIG. 8, and a high-pass filter having a cut-off frequency of 1.5 MHz was used as the filter circuit 142. A reference voltage value set in advance to the binarization circuit 143 was set to 0 V.

FIGS. 14A and 14B illustrate the measurement results of the waveforms of the vibration signal Vb and of the output signal I4a of the high-pass filter circuit 151 (see FIG. 10). As illustrated in FIG. 14B, four noise occurrences (times $t_1$, $t_2$, $t_3$, and $t_4$) were observed in the output signal I4a within one period of the power transmission frequency fp. This is the same result as that illustrated in FIG. 11F. Further, as illustrated in FIG. 14A, the times $t_1$ and $t_3$ of the four noise occurrence times substantially coincide with the timing of zero-cross of the vibration signal Vb. This means that influence of the noise on the foreign object detection increases when the foreign object detection is performed at the timing at which the intensity of a magnetic field for power transmission is equal to or smaller than a predetermined value as in the above-mentioned technique described in Patent Document 2.

In FIG. 14C, the vibration time length TL output from the vibration time length measurement circuit 145 in the next period of the power transmission frequency fp illustrated in FIGS. 14A and 14B is plotted. However, when obtaining the vibration time length TL, the counter circuit 144 was made to perform continuous counting. Further, every time the count value of the counter circuit 144 was incremented by one, the vibration time length measurement circuit 145 was made to output, as the vibration time length TL, the time length of a period between the time point corresponding to the increment and the time point corresponding to the next count value. As a result, the vibration time length TL in FIG. 14C is equal to the period of the vibration signal Vc.

As illustrated in FIG. 14C, the vibration time length TL significantly fluctuates between time $t_1+1/fp$ and time $t_2+1/fp$ and between time $t_3+1/fp$ and time $t_4+1/fp$, whereas it does not significantly fluctuate between time $t_{2+1}/fp$ and time $t_3+1/fp$ and maintains a value substantially equal to the inverse of the resonance frequency fr of the resonance circuit RC. This result reveals that by using the period between the time $t_2+1/fp$ and time $t_3+1/fp$ as the noiseless period NLP, the detection of the metallic foreign object can be performed without being affected by noise.

REFERENCE SIGNS LIST 1 wireless power transmission system
2 load
10 wireless power transmitting device
11 DC power supply
12 power converter
13 feeding coil part
14A, 14B, 16 metallic foreign object detector
15A, 15B noise detection part
20 wireless power receiving device
21 receiving coil part
22 rectifier
120 switch drive part
140 foreign object detection part
141 detection changeover switch
142 filter circuit
143 binarization circuit
144 counter circuit
145 vibration time length measurement circuit
146 determination circuit
147 memory part
147A, 147B control circuit
148 drive circuit
148a switching circuit
148b power supply
150, 160 detection part
151 high-pass filter circuit
C0 smoothing capacitor
C1 feeding side capacitor
C2 receiving side capacitor
C3 capacitor for metallic foreign object detector
D1-D4 diode
L1 feeding coil
L2 receiving coil
L3 antenna coil
L4 noise detection coil
RC resonance circuit
S sensor part
SW switching part
SW1-SW4 switching element

What is claimed is:

1. A wireless power transmitting device that performs power transmission by wireless using an alternating magnetic field vibrating at a predetermined power transmission frequency, the wireless power transmitting device comprising:
a feeding coil;
an antenna coil;

a capacitor that constitutes a resonance circuit together with the antenna coil;

a noise detection part that detects noise vibrating at a frequency higher than the power transmission frequency; and a foreign object detection part that detects a presence/absence of a metallic foreign object based on a change in voltage or current generated in the resonance circuit and a noise detection result from the noise detection part.

2. The wireless power transmitting device as claimed in claim 1, wherein the foreign object detection part includes:
a drive part that applies voltage to the resonance circuit; and
a control part that controls the drive part to apply the voltage at timing, which is shown by the noise detection result from the noise detection part, when a distortion does not occur in a vibration signal generated in the resonance circuit, and wherein the foreign object detection part is configured to detect the presence/absence of the metallic foreign object based on a vibration time length representing a length of time required for vibration corresponding to a predetermined wavenumber larger than 1 of a signal corresponding to a vibration signal generated in the resonance circuit in accordance with the voltage.

3. The wireless power transmitting device as claimed in claim 2, wherein the noise detection part includes at least one noise detection coil.

4. The wireless power transmitting device as claimed in claim 2, further comprising a switching part that switches a connection state between the antenna coil and the capacitor, wherein the noise detection part detects the noise based on a signal generated in the antenna coil, and wherein the switching part connects the antenna coil and the capacitor during a detection of the presence/absence of the metallic foreign object by the foreign object detection part, and disconnects the capacitor from the antenna coil during a noise detection by the noise detection part.

5. The wireless power transmitting device as claimed in claim 1, wherein the noise detection part includes at least one noise detection coil.

6. The wireless power transmitting device as claimed in claim 1, further comprising a switching part that switches a connection state between the antenna coil and the capacitor, wherein the noise detection part detects the noise based on a signal generated in the antenna coil, and wherein the switching part connects the antenna coil and the capacitor during a detection of the presence/absence of the metallic foreign object by the foreign object detection part, and disconnects the capacitor from the antenna coil during a noise detection by the noise detection part.

7. The wireless power transmitting device as claimed in claim 1, wherein the foreign object detection part is configured to discard a result of a detection of the presence/absence of the metallic foreign object executed based on a change in voltage or current generated in the resonance circuit when noise is detected by the noise detection part.

8. A wireless power transmission system that transmits power by wireless from a feeding coil to a receiving coil, the wireless power transmission system comprising:

a wireless power transmitting device having the feeding coil; and a wireless power receiving device having the receiving coil, wherein the wireless power transmitting device is the wireless power transmitting device as claimed in claim 1.

9. A wireless power receiving device that receives power by wireless using an alternating magnetic field vibrating at a predetermined power transmission frequency, the wireless power receiving device comprising:

a receiving coil;
an antenna coil;
a capacitor that constitutes a resonance circuit together with the antenna coil;
a noise detection part that detects noise vibrating at a frequency higher than the power transmission frequency; and
a foreign object detection part that detects a presence/absence of a metallic foreign object based on a change in voltage or current generated in the resonance circuit and a noise detection result from the noise detection part.

10. The wireless power receiving device as claimed in claim 9, wherein the foreign object detection part includes:
a drive part that applies voltage to the resonance circuit; and
a control part that controls the drive part to apply the voltage at timing, which is shown by the noise detection result from the noise detection part, when a distortion does not occur in a vibration signal generated in the resonance circuit, and wherein the foreign object detection part is configured to detect the presence/absence of the metallic foreign object based on a vibration time length representing a length of time required for vibration corresponding to a predetermined wavenumber larger than 1 of a signal corresponding to a vibration signal generated in the resonance circuit in accordance with the voltage.

11. The wireless power receiving device as claimed in claim 10, wherein the noise detection part includes at least one noise detection coil.

12. The wireless power receiving device as claimed in claim 10, further comprising a switching part that switches a connection state between the antenna coil and the capacitor, wherein the noise detection part detects the noise based on a signal generated in the antenna coil, and wherein the switching part connects the antenna coil and the capacitor during a detection of the presence/absence of the metallic foreign object by the foreign object detection part, and disconnects the capacitor from the antenna coil during a noise detection by the noise detection part.

13. The wireless power receiving device as claimed in claim 9, wherein the noise detection part includes at least one noise detection coil.

14. The wireless power receiving device as claimed in claim 9, further comprising a switching part that switches a connection state between the antenna coil and the capacitor, wherein the noise detection part detects the noise based on a signal generated in the antenna coil, and wherein the switching part connects the antenna coil and the capacitor during a detection of the presence/absence of the metallic foreign object by the foreign object detection part, and disconnects the capacitor from the antenna coil during a noise detection by the noise detection part.

15. The wireless power receiving device as claimed in claim 9, wherein the foreign object detection part is configured to discard a result of a detection of the presence/absence of the metallic foreign object executed based on a change in voltage or current generated in the resonance circuit when noise is detected by the noise detection part.

16. A wireless power transmission system that transmits power by wireless from a feeding coil to a receiving coil, the wireless power transmission system comprising:
- a wireless power transmitting device having the feeding coil; and
- a wireless power receiving device having the receiving coil,
- wherein the wireless power receiving device is the wireless power receiving device as claimed in claim 9.

* * * * *